United States Patent
Taira et al.

[11] Patent Number: 5,889,909
[45] Date of Patent: Mar. 30, 1999

[54] FERRULE FOR OPTICAL CONNECTOR

[75] Inventors: Junji Taira; Masahiro Nakajima; Kouji Minami; Hiroyuki Tokita; Tatsuo Koshigoe; Nobuo Suzuki, all of Nasu-gun, Japan

[73] Assignee: Seiko Instruments Inc., Japan

[21] Appl. No.: 839,917

[22] Filed: Apr. 21, 1997

[30] Foreign Application Priority Data

Apr. 22, 1996 [JP] Japan .................................. 8-099916

[51] Int. Cl.⁶ .................................................. G02B 6/36
[52] U.S. Cl. ........................................................... 385/78
[58] Field of Search .......................... 385/60–66, 78–85

[56] References Cited

U.S. PATENT DOCUMENTS

| | | | |
|---|---|---|---|
| 4,813,760 | 3/1989 | Tanaka et al. ...................... | 350/96.21 |
| 5,732,175 | 3/1998 | Fan ........................................... | 385/87 |

FOREIGN PATENT DOCUMENTS

| | | | |
|---|---|---|---|
| 506 003 | 9/1992 | European Pat. Off. . | |
| 0 784 219 A1 | 7/1997 | European Pat. Off. . | |
| 63-56617 | 3/1988 | Japan ..................................... | 385/61 |
| WO94/00785 | 1/1994 | WIPO . | |

OTHER PUBLICATIONS

Patent Abstracts of Japan, vol. 9, No. 232 (P–389) Sep. 18, 1985.
Patent Abstracts of Japan, vol. 7, No. 078 (P–188) Mar. 31, 1983.
Patent Abstracts of Japan, vol. 10, No. 041 (P–429) Feb. 18, 1986.

*Primary Examiner*—Hung N. Ngo
*Attorney, Agent, or Firm*—Adams & Wilks

[57] ABSTRACT

A ferrule for optical connectors which is of funnel type comprising a ferrule body, containing a small-diameter hole and a large-diameter hole having a larger diameter than the small-diameter hole, the small-diameter hole and the large-diameter hole being formed so as to allow an optical fiber to pass therethrough and communicate with each other, the ferrule further comprising a buffering hole having a diameter which is larger than that of the small-diameter hole but smaller than that of the large-diameter hole, the buffering hole being formed between the small-diameter hole and the large-diameter hole and containing groove of concave and convex pattern on the internal surface of the buffering hole. The ferrule body further contains three lines of protrusions extending along the axial thereof, which are formed on the internal surface of the large-diameter hole.

3 Claims, 4 Drawing Sheets

FERRULE FOR OPTICAL CONNECTOR

BACKGROUND OF THE INVENTION

This invention relates to a ferrule for optical connectors.

Generally, the ferrule for optical connectors is used to connect optical fibers directly with each other. As shown in FIG. 7, a conventional ferrule contains an optical fiber inserting hole 101 formed through a ferrule body 100 in its axial direction and an optical fiber inserted into the optical fiber inserting hole 101 is fixed therein by an adhesive. An excessive portion of the optical fiber protruding from each end of the ferrule body 100 is cut off and the cut portion thereof is finished to a mirror state so as to be used as a connecting end. By bringing this connecting end into contact with that of other ferrule body constructed in the same manner, the optical fibers are directly connected with each other.

Because the optical fibers are directly connected with each other through the ferrule as described above, the optical fiber must be firmly fixed to the interior of the optical fiber inserting hole 101 in the ferrule with an adhesive so as to have a predetermined fixing strength. Thus, this fixing strength is closely related to a length L of the optical fiber inserting hole 101 and the longer the length, the larger the fixing strength of the optical fiber in the optical fiber inserting hole 101 is. Usually, that length L is often selected to be about 10 mm.

However, if the length of the optical fiber inserting hole 101 is prolonged like this, the following difficulties may occur in processing of the optical fiber. That is, the linearity of the optical fiber inserting hole 101 cannot be easily obtained. Further, hole processing for making the optical fiber inserting hole 101 becomes difficult and it takes very long to process the internal surface of the optical fiber inserting hole 101. So that, a funnel type optical connector ferrule as shown in FIG. 8 has been proposed. This optical fiber inserting hole is constructed so as to have two steps, a large-diameter hole 102 and a small-diameter hole 103. By holding an optical buffered fiber by the large-diameter hole 102, the length LN of the small-diameter hole 103 for fixing the optical fiber is shortened.

Although the tunnel type ferrule can solve the problem of a difficulty in processing by shortening the length LN of the small-diameter hole 103 in which the optical fiber is to be fixed, a sufficient fiber fixing strength cannot be obtained easily and further a deviation in axis between the large-diameter hole 102 and the small-diameter hole 103 may occur. This often reduce connecting performance of the optical fiber.

That is, this type of ferrule is processed by centering in which the external diameter thereof is finished to a predetermined size with a small-diameter hole of the ferrule as a center of this processing. In this step, both ends of the funnel type ferrule are supported by two conical-shaped centers and then the ferrule is rotated to grind the outer peripheral surface thereof. Thus, if there is a difference in shape accuracy (e.g., circularity) between the small-diameter hole and the large-diameter hole, support points of both the centers cannot be set in the center of each of them, so that a deviation in axis occurs between the large-diameter hole and the small-diameter hole, thereby deteriorating connecting performance of the ferrule.

Therefore, an object of the present invention is to provide a ferrule for optical connectors which has been improved to solve the above described problem of the funnel type optical connector ferrule.

SUMMARY OF THE INVENTION

To solve the above described problem, there is provided a ferrule for optical connectors which is of funnel type comprising a ferrule body, containing a small-diameter hole and a large-diameter hole having a larger diameter than the small-diameter hole, the small-diameter hole and the large-diameter hole being formed so as to allow an optical fiber to pass therethrough and communicate with each other, the ferrule further comprising a buffering hole having a diameter which is larger than the small-diameter hole but smaller than the large-diameter hole, the buffering hole being formed between the small-diameter hole and the large-diameter hole and containing grooves of concave and convex pattern (serration) on the internal surface of the buffering hole in the axis or diameter direction. A diameter of the large-diameter hole may be of an appropriate size to allow the optical buffered fiber to pass therethrough.

When the optical fiber is inserted into the small-diameter hole and fixed thereto with an adhesive, the adhesive goes in between the optical fiber and the small-diameter hole, and at the same time, the adhesive goes in between the optical fiber and the buffering hole. In this case, because grooves of concave and convex pattern are formed on the internal wall of the buffering hole, a great amount of adhesive goes in between the internal wall of the buffering hole and the optical fiber. As a result, the optical fiber is fixed in the ferrule firmly by the adhesive. Because a required fixing strength between the optical fiber and the ferrule mostly depends on this bonding, the length of the small-diameter hole may be short. Further, because the internal surface of the small-diameter hole determines the accuracy of an optical fiber fixing position in the ferrule and so it is sufficient to finish only the internal surface of the small-diameter hole which maybe relatively short, to a predetermined size, this lead to reduction of processing time for the ferrule.

Furthermore, there is provided a ferrule for optical connectors wherein the internal surface of the large-diameter hole has three lines of protrusions extending along the axial direction thereof. These lines of protrusions are preferred to be provided at intervals of 120°. The height of the protrusions should be determined to be an appropriate one in which a circle passing through respective vertexes of three protrusions at an external end of the large-diameter hole does not interfere with the internal surface of the large-diameter hole.

This structure enables an accurate centering by a conical-shaped center applied thereto for the following reason when the outer diameter of the ferrule is ground with respect to the center of the diameter hole to a predetermined size. The inner peripheral surface of the small-diameter hole is substantially circular by polishing. On the other hand, a conical-shaped center applied to the outer side end of the large-diameter hole is supported by three protrusions provided thereon such that it is stably supported by three points. Thus, even if the large-diameter hole is itself not of absolute circular shape, accurate centering can be conducted. As a result, it is possible to process by both centers with the axes of the small-diameter hole and the large-diameter hole coincident with each other.

DETAILED DESCRIPTION OF THE INVENTION

An embodiment of the present invention will now be described in details with reference to the accompanying drawings.

Figure 1:
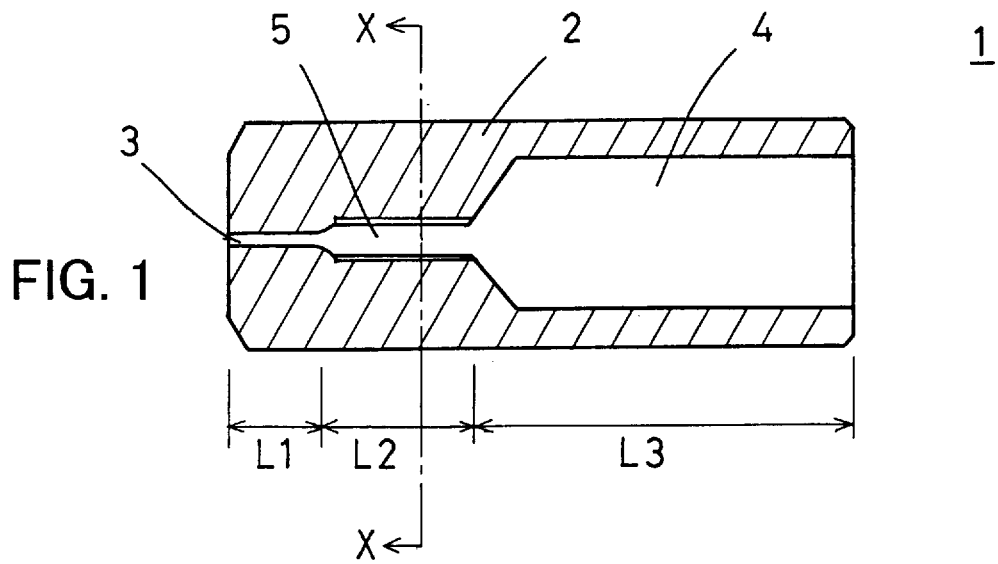
FIG. 1 is a longitudinal sectional view showing an embodiment of an optical connector ferrule according to the present invention.

FIG. 1 is a longitudinal sectional view of an embodiment of the optical connector ferrule according to the present invention. A ferrule 1 for optical connectors has a cylindrical ferrule body 2 having a through-hole for fixing an optical fiber. The through-hole comprises a small-diameter hole 3, a large-diameter hole 4 having a larger diameter than the small-diameter hole 3. A buffering hole 5 is provided between the small-diameter hole 3 and the large-diameter hole 4.

The diameter of the small-diameter hole 3 is determined to be slightly larger than the outer diameter of an optical fiber so that the optical fiber is inserted into it and positioned thereby. The small-diameter hole is formed so as to have the same cross section throughout the entire length L1. The internal surface of the small-diameter hole 3 is polished so as to have a predetermined level of surface roughness.

The large-diameter hole 4 is formed so as to have a slightly large diameter than the external diameter of the optical buffered fiber allowing the optical buffered fiber to pass through and have a length of L3. It has substantially the same cross section throughout the entire length thereof. A buffering hole 5 is formed so as to have a diameter which is larger than the internal diameter of the small-diameter hole 3 and smaller than the internal diameter of the large-diameter hole 4. The buffering hole 5 has substantially the same cross section throughout the entire length of L2.

Figure 2A:
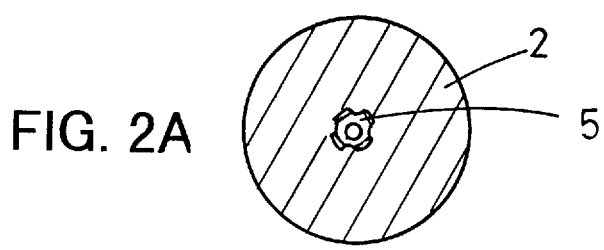
FIG. 2A is a sectional view taken along the lines X—X of the ferrule shown in FIG. 1 indicating its left portion.
Figures 2B, 2C:
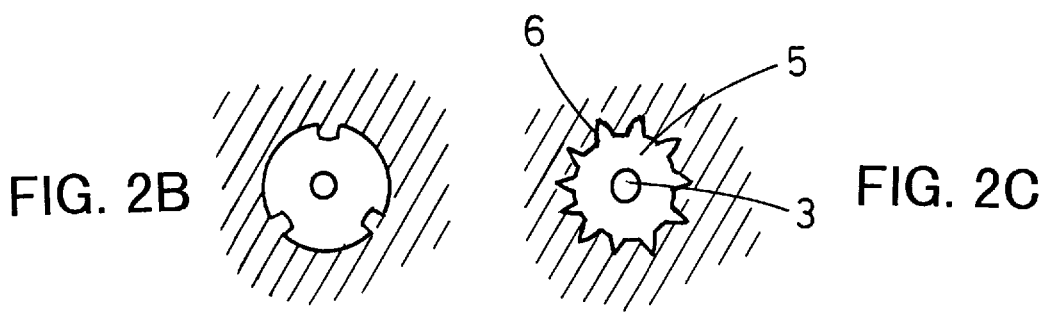
FIG. 2B, 2C are enlarged views of a portion around the buffering hole 5 in respective embodiments.

As shown in FIG. 2, grooves of concave and convex pattern are formed on the internal wall of the buffering hole 5 so as to form space for holding an adhesive between the optical fiber to be inserted into the buffering hole 5 and the buffering hole 5. This space may be formed appropriately so as to secure a volume sufficient for holding a sufficient amount of adhesive for fixing the optical fiber to the ferrule 2 with a predetermined fixing strength. The ferrule body 2 may be made of any known material such as ceramic, plastic, glass and metal. FIG. 2B shows an enlarged view of the buffering hole 5 in FIG. 2A, and FIG. 2C shows an enlarged view of a portion in the vicinity of the buffering hole 5 according to other embodiments.

According to this structure, when the optical fiber is inserted into the small-diameter hole 3 and fixed therein with an adhesive, the adhesive goes in between the optical fiber and the small-diameter hole 3 and also between the optical fiber and the buffering hole 5. In this case, because grooves of concave and convex pattern are formed on the internal wall of the buffering wall 5, adhesive of an amount sufficient for fixing the optical fiber on the internal wall of the buffering hole 5 goes in therebetween. This portion provides most of a fixing strength required between the optical fiber and the ferrule 2 and therefore the length L1 of the small-diameter hole 3 may be short. Here, the internal surface of the small-diameter hole 3 determines an accuracy of the optical fiber fixing position in the ferrule 2. Therefore, this can be done by only grinding the internal surface of the small-diameter hole 3 along the length L1 which is relatively short. Thus, it is possible to reduce a processing time for the formation of the ferrule 2. Meanwhile, because the buffering hole 5 does not function to directly determine the position of the optical fiber, finishing processing accuracy (hole diameter, shape) thereof may be relaxed as compared to the small-diameter hole.

Figure 3:
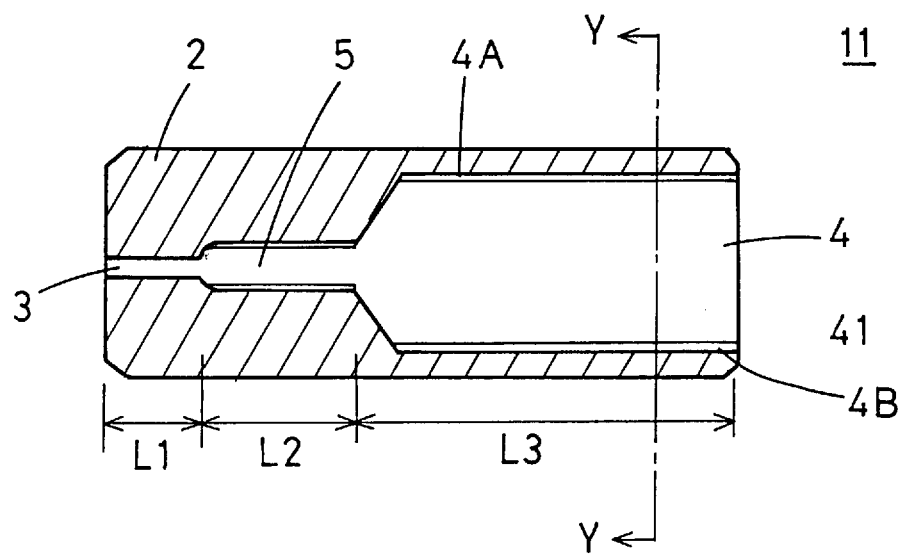
FIG. 3 is a longitudinal sectional view showing an embodiment of the optical connector ferrule according to the present invention.
Figure 4:
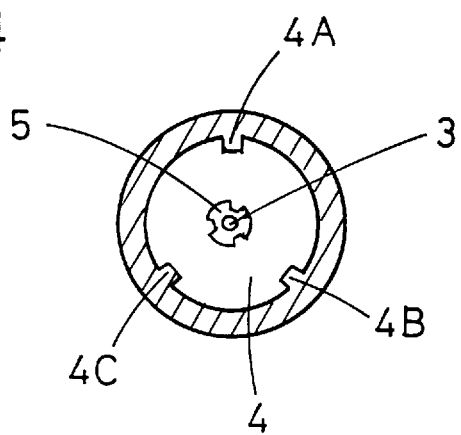
FIG. 4 is a sectional view taken along the lines Y—Y of the ferrule indicating its left portion.

FIG. 3 is a longitudinal sectional view of an embodiment of the optical connector ferrule according to an invention claimed in claim 2. FIG. 4 is a sectional view taken along the line Y—Y indicating a portion to the left therefrom in FIG. 3. Because a ferrule 11 for optical connector is basically the same as ferrule 1 shown in FIG. 1, the same reference numerals are attached to parts corresponding to each part of FIG. 1 and a description thereof is omitted. The ferrule 11 shown in FIG. 3 is different from the ferrule 1 shown in FIG. 1 in that three lines of protrusions 4A, 4B, 4C are formed axially on the internal wall of the large-diameter hole 4. According to the embodiment shown in this Figure, the protrusions 4A, 4B, 4C are formed with rectangular sections and at each interval of 120° on the internal wall of the large-diameter hole 4.

The ferrule 11 showing FIG. 3 provides the following effect in addition to an effect provided by the ferrule 1 shown in FIG. 1. That is, when the external surface of the ferrule 2 is ground with respect to the center of the small-diameter hole 3 to a predetermined size, because the internal surface of the small-diameter hole 3 is in a substantially circular state due to grinding, accurate centering can be conducted by a conical center (not shown) applied thereto. On the other hand, a conical center (not shown) applied to an external end 41 of the large-diameter hole 4 is supported at three protrusions 4A–4C provided thereon such that it is stably supported by three points. Thus, even if the large-diameter hole 4 is itself not of absolute circular shape, accurate centering can be conducted. As a result, processing by both centers in which the axes of the small-diameter hole 3 and the large-diameter hole 4 easily coincide with each other is enabled.

Figure 5:
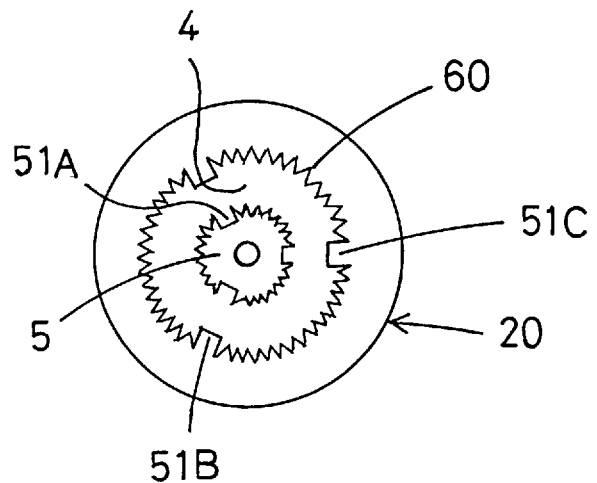
FIG. 5 is a sectional view showing an embodiment of an optical connector ferrule.

FIG. 5 is a longitudinal sectional view of another embodiment of the optical connector ferrule. With respect to parts shown in FIG. 5, the same reference numerals are used to designate parts corresponding to FIG. 1 and a description thereof is omitted.

A ferrule 20 shown in FIG. 5 has three protruded sections 51A, 51B, 51C having each rectangular cross section and a small protrusion group 60 formed in configuration of a plurality of concave and convex portions. The three protruded sections and the small protrusions are formed on the internal surface of the large-diameter hole 4 and the buffering hole 5 in the axial direction. The three protruded sections 51A, 51B, 51C are preferred to be provided at each interval of 120° like the second embodiment.

In this structure, the small protrusion group 60 connecting three protruded sections allows a large amount of adhesive to go in between the optical buffered fiber and the large-diameter hole, thereby producing an anchor effect to increase the fixing strength. By providing the internal wall of the buffering hole with the same structure, the fixing strength can be increased as in the above described embodiment. Further, in this case, the shape of the large-diameter hole is continuous with that of the buffering hole so that processing thereof is made easy.

Figure 6:
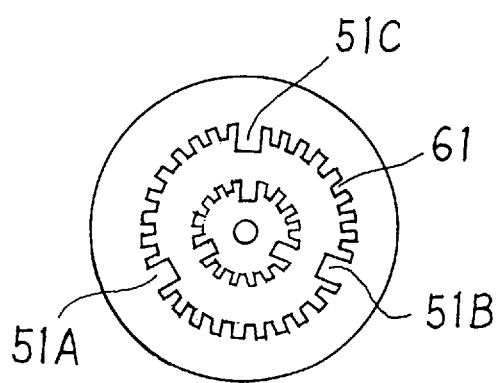
FIG. 6 is a sectional view showing other embodiment of an optical connector ferrule.
Figure 7:
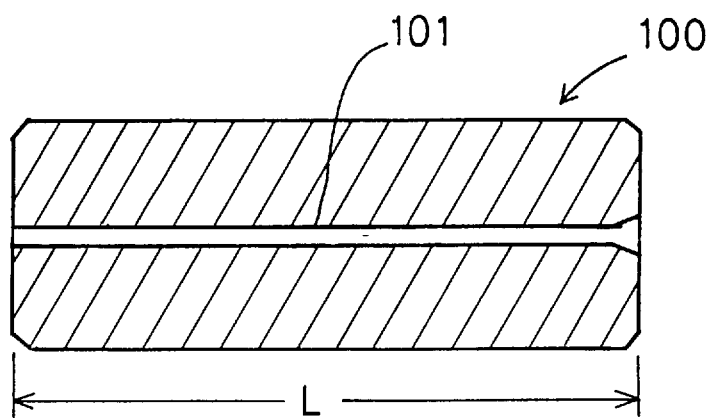
FIG. 7 is a longitudinal sectional view of a conventional ferrule.
Figure 8:
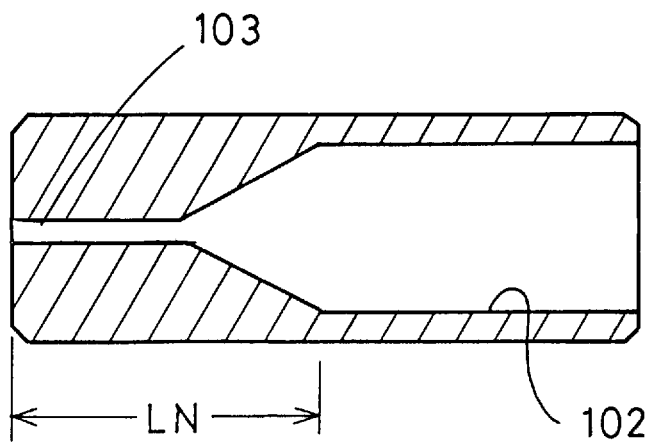
FIG. 8 is a longitudinal sectional view of a conventional funnel type ferrule.

FIG. 6 shows another embodiment in which respective parts are the same as those of FIG. 5 except that the small protrusion group 61 have each rectangular cross section which is smaller than that of the protruded section.

Because grooves of concave and convex pattern (serration) are formed on the internal wall of the buffering hole in the axis direction, a great amount of adhesive goes in between the internal wall of the buffering hole and the optical fiber. As a result, the fixing strength between the optical fiber and the ferrule can be remarkably increased and the length of the small-diameter hole may be short. This leads to reduction of processing time for the ferrule.

When the external surface of the ferrule is ground with respect to the center of the small-diameter hole to a predetermined size, because the internal surface of the small-diameter hole is in a substantially circular state produced by grinding, accurate centering can be conducted by a conical center applied thereto. On the other hand, a conical center applied to an external end of the large-diameter hole is supported by three protrusions provided thereon such that it is stably supported at three points. Thus, even if the large-diameter hole is itself not of absolute circular shape, accurate centering can be conducted. As a result, processing by both centers in which the axes of the small-diameter hole and the large-diameter hole easily coincide with each other is enabled.

Meanwhile, although the small-diameter hole and the buffering hole are subjected to final finishing processing such as grinding, this invention may be also applied to ferrules in which a target dimension, shape and accuracy may be obtained by only molding processing.

What I claimed is:

1. A ferrule for optical connectors which comprises a ferrule body provided with a small-diameter hole and a large-diameter hole, said small-diameter hole and said large-diameter hole being formed so as to allow an optical fiber to pass therethrough and communicate with each other, said ferrule further comprising a buffering hole having a diameter which is larger than that of said small-diameter hole but smaller than that of said large-diameter hole, said buffering hole being formed between said small-diameter hole and said large-diameter hole and containing grooves of concave and convex pattern on the internal surface of said buffering hole.

2. A ferrule for optical connectors as claimed in claim 1, wherein the internal surface of the large-diameter hole has three lines of protrusions extending along the axis thereof.

3. A ferrule for optical connectors as claimed in claim 2, wherein the internal surface of the large-diameter hole further has a small protrusion group between said three lines of protrusions.

* * * * *